United States Patent [19]

Berge et al.

[11] Patent Number: 5,371,151

[45] Date of Patent: Dec. 6, 1994

[54] CURABLE COMPOSITION COMPRISING CROSSLINKABLE POLYMERS PREPARED FROM OLIGOMERIC CHAIN TRANSFER AGENTS

[75] Inventors: Charles T. Berge, Wilmington, Del.; Michael J. Darmon, Aston, Pa.; Joseph A. Antonelli, Riverton, N.J.

[73] Assignee: E. I. du Pont de Nemours and Company, Wilmington, Del.

[21] Appl. No.: 104,957

[22] Filed: Aug. 9, 1993

Related U.S. Application Data

[63] Continuation of Ser. No. 876,764, May 1, 1992, Pat. No. 5,264,530.

[51] Int. Cl.⁵ .............................................. C08C 19/22
[52] U.S. Cl. ...................... 525/377; 526/194; 526/213; 526/201; 526/206; 526/207; 526/209; 526/215; 526/217; 526/204
[58] Field of Search .............. 526/194, 213, 201, 206, 526/207, 209, 215, 217, 204; 525/377

[56] References Cited

U.S. PATENT DOCUMENTS

| | | | |
|---|---|---|---|
| 3,382,297 | 5/1968 | Thompson | 526/201 |
| 3,968,059 | 7/1976 | Shimate et al. | 526/68 |
| 4,170,582 | 10/1979 | Mori et al. | 526/273 |
| 4,518,726 | 5/1985 | Kato et al. | 524/32 |
| 4,526,945 | 7/1985 | Carlson et al. | 526/145 |
| 4,547,323 | 10/1985 | Carlson | 260/465.4 |
| 4,621,131 | 11/1986 | Lin et al. | 528/192 |
| 4,680,352 | 7/1987 | Janowicz et al. | 526/120 |
| 4,694,054 | 9/1987 | Janowicz | 526/120 |
| 4,808,656 | 2/1989 | Kania et al. | 524/558 |
| 4,965,317 | 10/1990 | Kania et al. | 525/155 |

FOREIGN PATENT DOCUMENTS

| | | | |
|---|---|---|---|
| 0261942 | 3/1988 | European Pat. Off. | |
| 0268705 | 6/1988 | European Pat. Off. | 526/201 |
| 0331999 | 9/1989 | European Pat. Off. | 526/201 |
| 5384092 | 7/1978 | Japan . | |
| 5384092 | 7/1978 | Japan | 526/201 |
| 56-139504 | 10/1981 | Japan | 526/201 |
| 328202 | 2/1991 | Japan | 526/201 |
| 3028202 | 2/1991 | Japan . | |
| 3161592 | 7/1991 | Japan . | |
| 3161593 | 7/1991 | Japan . | |
| 1083486 | of 1913 | United Kingdom | 526/201 |
| 870191 | 6/1961 | United Kingdom | 526/201 |
| 2161170 | 1/1986 | United Kingdom | 526/201 |
| 8103334 | 11/1981 | WIPO | 526/201 |

OTHER PUBLICATIONS

"Reactivity of Macromonomers in Free Radical Polymerization" JMS Rev. Macromol. Chem. Phys. C30(374) 305–377 (1990).
"The Chemistry of Unsaturated Oligomers and Polymers" David Scott Harrison, B. App. Sc. Jun. 1988 2–103.
Polymer Bulletin "The Use of Model Compounds in Interpreting the Thermal Degradation of Poly(Methyl Methacrylate)" 325–328 (1984).
"Catalyzed Chain Transfer to Monomer in Free Radical Polymerization" N. S. Enikolopyan, B. R. Smirnov, G. V. Ponomeare, and I. M. Belgovskii 879–889 (1981).
"Polym Mater Sci Eng" 1986, ss., none, pp. 235–238. Reactive Dimersof: Abbey K. H. G. M. Carlson.
"Copolymerization of Unsaturated Oligo(Methyl Methacrylate): Now Macromonomers" P. Cacioli 839–852 (1986).

(List continued on next page.)

Primary Examiner—Joseph L. Schofer
Assistant Examiner—N. Sarofim
Attorney, Agent, or Firm—Chris P. Konkol

[57] ABSTRACT

A curable composition comprising a crosslinkable copolymer, wherein the copolymer is the free radical polymerization product of a mixture of monomers in the presence of a terminally unsaturated oligomeric chain transfer catalyst. Such compositions have advantageous properties when used in a variety of products including high performance coatings.

11 Claims, No Drawings

OTHER PUBLICATIONS

"Catalytic Chain-Transfer in Polymerization of Methyl Methacrylate I. Chain-Length Dependence of Chain-Transfer Coefficient" R. Amin Sanayei (1989) 1132–1149.

"Polymerization Reactivity of Unsaturated Eng Group Generated During the Disproporationation in Termination Reaction of Methyl Methocrylate Polymerization" Tanaka 1761–1768 1987.

"Macromonomer Prepared by Polymerization of Methyl Methacrylate in the Presence of Ethyl a-(-Bromomethyl) Acrylate" Bunichiro Yamada 513–518 (1990).

"Catalystic Chain Transfer-in Polymerization of Methyl Methacrylate II. Continous Synthesis and Purification of Macromer" K. G. Suddalg 1565–1575 (1991).

"Dimethyl 1-Hexene-2,5-Dicarboxylate, Methyl Methacrylate Dimer, as Polymerizable Acrylic Ester Bearing Bulky $\beta$-Substituent" Tasayuki Otsu 837–842 (1991).

"Preparation of Poly(Methyl Methacrylate) Macromonomers by Radical Polymerization in the Presence of Methyl (x-(Bromomethyl)Acrylate and Copolymerization of the Resultant Macromonomer" Bunichiro Yamada 423–430 (1991).

CURABLE COMPOSITION COMPRISING CROSSLINKABLE POLYMERS PREPARED FROM OLIGOMERIC CHAIN TRANSFER AGENTS

CROSS-REFERENCE TO RELATED APPLICATION

This application is a continuation of U.S. patent application Ser. No. 07/876,764, filed May 1, 1992 now U.S. Pat. No. 5,264,530.

FIELD OF THE INVENTION

This invention relates to a curable composition comprising a crosslinkable polymer. The crosslinkable polymer is prepared using a ω-unsaturated oligomers as a chain transfer agent.

BACKGROUND OF THE INVENTION

In preparing a film-forming polymer for a coating or other kind of curable composition, it is necessary to be able to control the molecular weight of the polymer so that it may be fitted to its particular use or needs. For example, in unperturbed polymerization systems which fundamentally tend to produce high molecular weight polymers, it may be desirable or necessary to limit the molecular weight of the polymers produced, and this must be done in a fairly predictable and controllable fashion. Such molecular weight limitation may be desirable or necessary in the preparation of polymer solutions for use in paints and finishes which require high solids content to assure reduced solvent emission during application and yet which require low viscosity to facilitate ready application.

In free radical polymerizations, there are a number of conventional means of effecting such molecular weight limitation. These, along with notable disadvantages or problems, include:

(1) A high initiator/monomer ratio. However, this may be costly in terms of initiator consumption. Also, high initiator levels may also produce undesirable end groups on the polymers produced.

(2) Polymerization at high temperatures. However, this may lead to undesirable depropagation, thermal initiation, and undesirable secondary reactions.

(3) Adding stoichiometric amounts of thiol chain transfer agents to the polymerizing system. However, the attendant incorporation of sulfur-containing agents into the polymer may render it less durable than is desired. There may also be odor problems associated with the use of sulfur-containing chain transfer agents.

(4) Chain transfer agents employing cobalt (II or III) chelates such as disclosed in U.S. Pat. No. 4,680,352 and U.S. Pat. No. 4,694,054. However, a possible disadvantage of these is that some do not work in water and some are adversely affected or deactivated by low pH. They may cause color problems, especially if interaction with some monomers may require higher levels of the cobalt chelate.

(5) Group transfer agents such as disclosed in U.S. Pat. Nos. 4,417,034 and 4,414,372 or European patent application publication 0 248 596. However, they are specific to methacrylated polymers and relatively expensive. They are also sensitive to certain monomers and impurities which contain active hydrogens, e.g., hydroxyl, carboxyl, carboxylic acid, or amine. Special solvents may be required and blocked hydroxyl and carboxyl monomers may be needed which require a special de-blocking step to activate the protected group.

Terminally or ω-ethylenically unsaturated oligomers having chain transfer properties, in some contexts, is also known. There have been a number of studies and articles on such oligomers acting as chain transfer agents.

Such oligomers may be viewed as macromonomers in terms of structure, in that "macromonomers" refer to oligomers which have terminal olefinic moieties. Macromonomer products, however, are usually of a relatively higher molecular weight than such oligomers, although there may be an overlap in terms of molecular weight, particularly where distributions of oligomers and macromonomers are concerned. (A macromonomer may be defined as polymers or copolymers having a terminal olefinic moieties and consisting of about 10 to about 800 monomeric units, with an average molecular weight varying from about 1000 to 50,000, preferably 1,000 to 10,000.)

Terminally olefinic oligomers and macromonomers are known, for example, as disclosed in U.S. Pat. No. 4,547,327; U.S. Pat. No. 4,170,582; U.S. Pat. No. 4,808,656, Japanese patent 3,161,562; Japanese patent 3,161,593. See also, P. Cacioli, et al., *J. Makromol. Sci.-Chem.*, $A$23 (7), 839–852 (1986) and H. Tanaka, et al., *Journal of Polymer Science; Part A;* Polymer Chemistry, 27, 1741–1748 (1989).

It is an object of this invention to provide a composition which comprises a functional or crosslinkable film-forming homopolymer or copolymer which has been prepared by employing an ω-unsaturated oligomer as a catalytic chain transfer agent.

The present composition can be used in making coatings exhibiting improved properties.

These and other objects will become apparent hereinafter.

SUMMARY OF THE INVENTION

The present invention provides an improved composition which comprises a crosslinkable polymer prepared by polymerization in the presence of a chain transfer agent which is an ω-unsaturated oligomer, as defined below. The compositions so produced have been found to have improved properties for use in coatings, especially finishes and paints. Such compositions may comprise, by weight of (a) and (b) below:

(a) 5 to 60 percent, preferably 20 to 40 percent, of a crosslinking agent and (b) 40 to 95 percent, preferably 80 to 60 percent, of a functional polymer made by the present process of polymerizing a functional monomer in the presence of an oligomeric chain transfer agent having the required end group structure.

Such a composition may be used in pigmented or unpigmented coatings. In one embodiment of the present invention, the crosslinking agent is an isocyanate and the functional polymer is a hydroxy-functional copolymer. In other embodiments the functional polymer is an silane- or epoxy-functional copolymer, crosslinkable with itself and/or other components or crosslinking agents in the composition.

DETAILED DESCRIPTION OF THE INVENTION

This invention is directed to a curable composition comprising at least one functional copolymer which is the polymerization product of a reaction mixture of comonomers at least a portion of which carry functional groups which can serve as crosslinking sites.

The polymer is the reaction product of a monomer mixture which is 80 to 100% by weight of methacrylates of the formula $CH_2=C(CH_3)CO_2J$ wherein J is H, $C_1$-$C_{12}$ alkyl, $C_2$-$C_{12}$ alkenyl, glycidyl, $C_2$-$C_{12}$ hydroxyalkyl, allyloxyethyl, 2,4-hexadienyl, $C_xH_{(2x+1-y)}F_y$ where x is 1 to 16 and y is 0 to 2x+1, $R_6R_7N(CH_2)_z$ where $R_6$ and $R_7$ are independently $C_1$ to $C_{12}$ alkyl and z is 1 to 10, or $R_8R_9R_{10}Si(CH_2)_z$ where $R_8$, $R_9$ and $R_{10}$ are independently $C_1$ to $C_{12}$ alkyl or $C_1$ to $C_{12}$ alkoxy and z is 1 to 10; methacrylonitrile, maleic anhydride, fumarate derivatives such as fumaronitrile, dialkylfumarate and fumaric acid; methacrylamide derivatives of the formula $CH_2=C(CH_3)CON(R)_2$ wherein each R is independently H, $C_1$ to $C_{10}$ alkyl or $(CH_2)_nZ$, n is an integer from 1 to 10, Z is COOY, OH, $N(R_1)_2$, $SO_3Y$ and Y is H, Li, Na, K, or $N(R)_4$; vinyl esters and acetates of the formula $CH_2=CHOOCR$, wherein R is $C_1$ to $C_{12}$ alkyl; and any and all monomer mixtures thereof. In the preferred embodiment, in which the monomer units of the polymer preferably is 80-100% by weight of methacrylate acid or alkyl esters or functional alkyl esters thereof, according to the above formula having J as a group, particularly preferred functional alkyl esters are those where J according to the above formula is hydrogen, glycidyl or hydroxy alkyl. In general herein, $C_1$ to $C_{10}$ moeities or groups are preferably $C_1$ to $C_6$ and usually most preferably $C_1$ to $C_4$.

The monomer (or comonomer) mixture may also comprise minor amounts of styrene and acrylates and derivatives thereof. In another embodiment, the monomer mixture may comprise up to 20% by weight of the following monomers: vinyl halides of the formula $CH_2=CHX$ wherein X is Cl or F, vinylidene halides of the formula $CH_2=C(X)_2$ wherein each X is independently Cl or F, substituted butadienes of the formula $CH_2=C(R)C(R)=CH_2$ wherein each R is independently H, $C_1$ to $C_{10}$ alkyl, Cl or F, ethylenesulfonic acid derivatives of the formula $CH_2=CHSO_3X$ wherein X is Na, K, Li, $N(R)_4$, H, R or $(CH_2)_nZ$ where n is an integer from 1 to 10, Z is COOY, OH, $N(R)_2$, or $SO_3Y$, Y is H, Li, Na, K or N(R) and R is independently $C_1$ to $C_{10}$ alkyl, acrylamide derivatives of the formula $CH_2=CHCON(R)_2$ wherein each R is independently H, $C_1$ to $C_{10}$ alkyl, or $(CH_2)_nZ$, n is an integer from 1 to 10, Z is COOY, OH, $N(R_1)_2$ or $SO_3Y$ and Y is H, Li, Na, K or $N(R_1)_4$ where R is $C_1$ to $C_{10}$ alkyl. As indicated above, at least a portion of the monomers carry functional groups which can serve as crosslinking sites. Suitably, 2.0 to 100 percent by weight of the comonomers have a reactive functionality or a mixture of reactive functionalities, for example hydroxy plus silyl. Preferably, 5 to 60% of the monomers have a reactive functionality or a mixture of reactive functionalities, most preferably 20 to 40%. The functional monomer may be selected from the foregoing monomers which have functional groups. Preferred functional groups are hydroxy, epoxy, anhydride, carboxy (acid), acetoacetoxy, silyl, amide, and isocyanato. In certain preferred embodiments, the crosslinkable functional groups, in the copolymers according to the present invention, are hydroxy, epoxy, silyl, carboxy, or combinations thereof.

The methacrylates described above would thus include branched, unbranched, or cyclical alkyl or n-alkyl esters of $C_1$-$C_{12}$ alcohols (for example, methyl and ethyl methacrylate), methacrylic acid, and allyl, glycidyl, hydroxyalkyl (for example, hydroxyethyl and hydroxypropyl), allyloxyethyl, 2,4-hexadienyl (sorbyl), dialkylaminoalkyl, fluoroalkyl, and trialkylsilylalkylene methacrylates. In general, preferred alkyls have 1 to 6 carbon atoms.

Of the contemplated monomers (corresponding to monomeric units in the crosslinkable polymer), preferred for reasons of commercial applicability, cost, and/or ease of synthesis are the methacrylates.

As one skilled in the art would recognize, however, each monome must have polymerizing compatibility with any adjacent monomers. "Polymerizing compatibility: as used herein, is determined by taking into account the steric and electronic properties of particular monomers. The polymerizing compatibility of various monomers is well-documented in the art. See, e.g., Young, L. H. "Copolymerization Reactivity Ratios" in Polymer Handbook, J. Brandrup and E. H. Immergut, eds., John Wiley & Sons, Inc. (1975). For example, α-methyl styrene does not have polymerizing compatibility with itself in free radical polymerizations above 60° C. and therefore cannot form homopolymers under these conditions. Thus, in the copolymer, α-methyl styrene may not occur adjacent to another α-methyl styrene under such reaction conditions. Also, maleic anhydride, fumaronitrile, dialkyl fumarate and fumaric acid do not have any polymerizing compatibility with themselves or with each other via free radical polymerization. Thus, for example, in the copolymer, maleic anhydride may not occur adjacent to another maleic anhydride, fumaronitrile, dialkyl fumarate or fumaric acid.

The polymer for use in the present composition is prepared by employing, as a free radical chain transfer agent, relatively low molecular weight oligomers having ω-unsaturation and at least two monomeric units, which oligomers may itself be made with a metal chelate chain transfer catalyst. However, although less preferred, it is contemplated that ω-unsaturated oligomeric compounds might also be prepared without polymerization, according to a known or routine organic synthesis.

The oligomeric chain transfer agents employed in preparing the present compositions may be a pure compound or a polydisperse mixture of compounds. These materials have utility either alone or as blends when used as chain transfer agents for virtually any free radical polymerization.

Preferably, the present chain transfer agents are used as a polydisperse mixture, which mixture has a distribution of molecular weights having a very low degree of polymerization, i.e., DP=2 to 100, preferably 2 to 20, and most preferably 2 to 7. For each particular oligomeric compound. n is an integer.

The present chain transfer agents (as well as the macromolecules or polymers produced thereby) include those having the following end group:

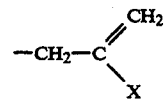

where X is $-CONR_2$, $-COOR$, $OR^1$, $-OCOR$, $-OCOOR^1$, $-NRCOOR^1$, halo, cyano, or a substituted or unsubstituted phenyl or aryl, wherein each R is independently selected from the group of hydrogen, silyl, or a substituted or unsubstituted alkyl, alkyl ether, phenyl, benzyl, or aryl, wherein said groups may be substituted with epoxy, hydroxy, isocyanato, cyano, amino, silyl, acid (-COOH), halo, or acyl; and wherein $R^1$ is the same as R except not H; wherein each alkyl is independently selected from the group consisting of branched, unbranched, or cyclical hydrocarbons having 1 to 12, preferably 1-6, and most preferably 1-4 carbon atoms; halo or halogen refers to bromo, iodo, chloro and fluoro, preferably chloro and fluoro, and silyl includes—$SiR^2(R^3)(R^4)$ and the like, wherein $R^2, R^3$, and $R^4$ are independently alkyl, phenyl, alkyl ether, or phenyl ether, preferably at least two of $R^2$, $R^3$, and $R^4$ being a hydrolyzable group, more preferably two of which are alkyl ether, wherein alkyl is as defined above, preferably methyl or ethyl. A plurality of silyl groups may be condensed, for example, an organopolysiloxane such as $-Si(R^2)_2-O-Si(R^3)_2R^4$, wherein $R^2$, $R^3$, and $R^4$ are independently alkyl. See U.S. Pat. No. 4,518,726 for silyl groups in general.

A preferred class of oligomeric chain transfer agents for use in preparing compositions according to the present invention are those oligomers according to above structure in which X is $-CONR_2$, $-COOR$, unsubstituted or substituted phenyl, aryl, halo, or cyano, and R is as defined above.

A more preferred class of olgiomeric chain transfer agents for use in the present invention are those oligomers according to above structure in which X is -COOR or phenyl and R is alkyl or phenyl unsubstituted or substituted with epoxy, hydroxy, alkoxysilyl or hydrogen.

The chain transfer agents employed in the present invention are to be distinguished from the more conventional oligomers or macromonomers having the following end group:

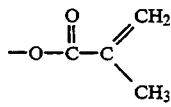

Preferably, the oligomers employed in the present invention, as well as the macromonomers and polymers produced thereby, are characterized by the following end group:

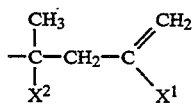

wherein $X^1$ and $X^2$ are independently (the same or different) X as defined above.

The general chemical structure of suitable oligomers for use in the present invention is described below where n=2 to 100 on average.

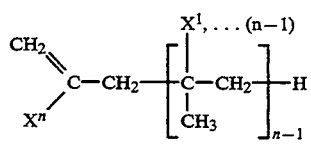

wherein $X^1$ to $X^n$ is independently defined as above for X and n is on average 2 to 100, preferably 2 to 20.

For example, a general formula for a methacrylate oligomer is as follows:

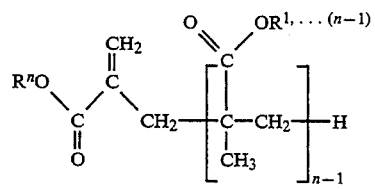

wherein $R^1$ to $R^n$ are independently (the same or different) and defined as above for R and n is on average 2 to 20, preferably 2 to 7.

As a further very specific example, a methyl methacrylate trimer, wherein n equals 3 and R equals -$CH_3$, is as follows.

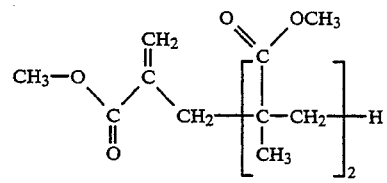

As indicated above, dimers, trimers, tetramers, etc., as defined above, or mixtures thereof, are suitably employed in the present invention. Mixtures of varying molecular weight are probably easier to prepare in large quantities. A wide range of molecular weight oligomers may be made, which in turn may be distilled to obtain a purer or pure oligomer, for example the tetramer. The oligomers do not have to be in any particular form and they may be stored and added in bulk, as liquids or solids, mixed in a solvent, mixed with monomers.

Many of the present oligomers (or similar macromonomers) employed in the present process are known, for example as taught in Janowicz published European Patent Application 0 261 942, herein incorporated by reference. The alpha-methyl styrene dimer, which is the same as the compound 2,4-diphenyl-4-methyl-1-pentene, is known as a chain transfer agent, although its preparation by a polymerization process, for example a metal chelate chain transfer process, or its inclusion in a molecular weight distribution is not believed conventional. The claimed invention does not include the use of the pure dimer, i.e. a compound according to the above formula when n is 2 and X is phenyl, but does not exclude a distribution of such oligomeric chain transfer agent s that may include that particular compound. However, chain transfer agents with such a phenyl or aryl group may be less preferred for reasons of the properties of the resulting polymers as a consequence of the presence of aromatic end groups derived from the chain transfer agent.

According to the present invention, suitable oligomeric chain transfer agents are dimers, trimers, tetramers, and higher oligomers of monomers. Thus, oligomers comprising branched, unbranched or cyclical methacrylates such as methyl, ethyl, propyl, butyl, 2-ethylhexyl, and/or decyl methacrylate; cyclohexyl, phenyl, or benzyl methacrylate; glycidyl methacrylate, hydroxyethyl or hydroxypropyl methacrylate, methacrylic acid, methacrylonitrile, methacrylamide, 2-isocyanatoethyl methacrylate, dimethylaminoethyl methacrylate, N,N-dimethylamino-3-propyl methacrylamide, t-butylaminoethyl methacrylate, and silanes such as methacryloxypropyltrimethoxysilane, or mixtures of the foregoing, and numerous others can be employed. Hetero oligomeric chain transfer agent s, as for example, the reaction product of methylmethacrylate and methacrylonitrile are suitable. These oligomeric chain transfer agent s are most easily made by a metal chelate catalytic chain transfer, for example a cobalt chelate, as will be explained below, but they could be made by other methods as well.

The present chain transfer agents can be used, for example to control molecular weight during polymerization of acrylic and other monomers, in an effective amount of only a few percent by weight of the oligomer present in the monomer mixture. A suitable range of oligomeric chain transfer agent is between 0.01% and 80% by weight, preferably about 0.1 to 40%, and most preferably 1 to 10% by weight of the monomer reactants. For bulk or bead polymerization, where in some cases it may be desired to bring down the molecular weight only slightly from its unregulated molecular weight, then only 0.001 to 5% of the oligomeric chain transfer agent may be suitable.

The polymers made according to the present invention have wide utility, including use in coatings and sealants, basically wherever one skilled in the art would use a low molecular weight, low dispersity polymeric material. With respect to coatings in which durablity is desired, polymers and compositions thereof, made according to the present invention, can have advantageous properties associated with the above mentioned end groups. For example, the QUV performance of clears thusly made may be improved compared to clears made with an alternative method such as high initiator level, high temperature, or alternative chain transfer agents. The miscibility and/or viscosity differences may also be improved. Hence, polymers can be made without the deleterious moieties that enter from alternative methods of molecular weight control.

Although applicants do not wish to be bound by any theory, it is believed that, when employing the present chain transfer agents, the attendant molecular weight control occurs because the oligomer can, in addition to copolymerizing normally, also undergo a beta-scission reaction. This beta-scission reaction causes part of a oligomer molecule to become attached to the other end of the growing polymer molecule, thus terminating its growth. The detached portion of the oligomer, now containing a free radical center, propagates by addition to free monomers in the reaction system. To the extent that normal copolymerization is also taking place, there will be additional oligomeric units randomly incorporated along the polymer chain. If beta-scission is made to predominate over normal copolymerization, then telechelic polymers having a functional group attached to the end of the polymer may be produced at high levels. Although illustrated with a particular X group, from the above formula, the following kind of reaction mechanism is believed to occur.

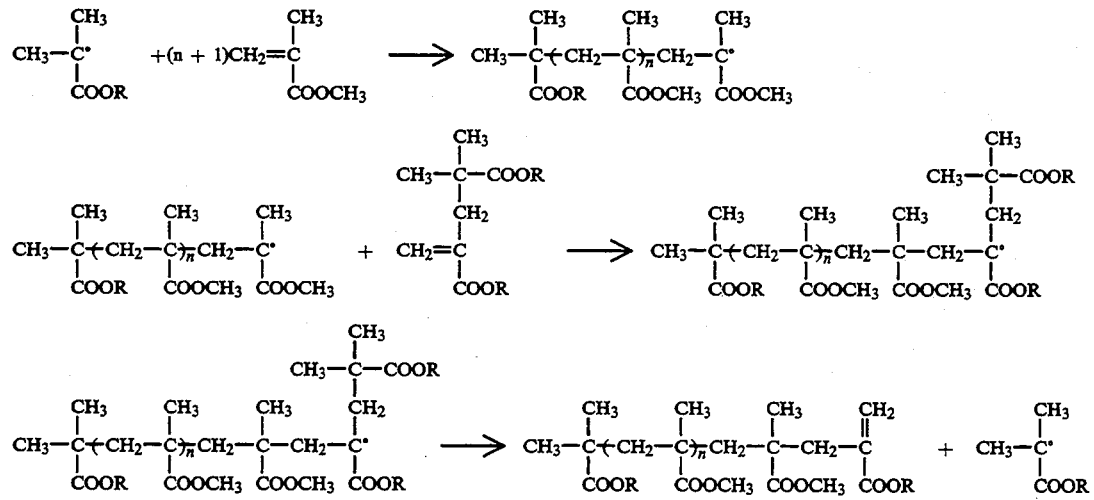

Regarding the composition of the present invention, the primary film-forming polymer may be prepared by free radical polymerization of unsaturated monomers, some of which carry the functional groups for later crosslinking. Such polymerization can occur in suspension, emulsion or solution polymerization, in aqueous or organic media, as will be familiar to those skilled in the art.

The chain transfer agents employed in the preparing the present compositions are typically prepared by standard solution polymerization techniques, but may also be prepared by emulsion, suspension or bulk polymerization processes. Preferably, a metal chelate chain transfer catalyst is employed in the method of preparation. Such a method is disclosed in the above mentioned U.S. Pat. No. 4,680,352, issued to Janowicz et al. and U.S. Pat. No. 4,694,054, issued to Janowicz. both of which are commonly assigned and hereby incorporated by reference in their entirety. However, various cobalt (II) and cobalt (III) chain transfer agents are useful, as for example disclosed in PCT WO 87/03605 published on Jun. 18, 1987. To obtain some of the relatively lower molecular weight oligomers employed as chain transfer agents according to the present invention, as compared to typically relatively higher molecular weight macromonomers as in Janowicz's U.S. Pat. No. 5,028,677, one could employ higher amounts of a metal chelate chain transfer agent. Thus, essentially, the same prior art process can be used in making the present relatively low molecular weight oligomers such as dimers and trimers. In effect, one chain transfer agent (e.g. a cobalt chelate) is used to make another chain transfer agent (the oligomeric compound).

When employing a cobalt chelate in the preparation of the present oligomers, it may be feasible to remove cobalt as well as any color from the reaction product by precipitation with a solvent and the subsequent use of activated charcoal. For example, the addition of ethyl acetate (Rhone-Poulenc AR grade, 99.5%, 0.005% acetic acid) in various proportions has been found to cause substantial precipitation of cobalt as a dark brown solid and therefore decreased color in the final solution. Other precipitating solvents include a mixture of acetone and ater and a mixture of acetonitrile and water. Color may be further removed by classical techniques, for example, simple treatment with activated charcoal for about 15 minutes followed by filtration though a short column packed with CELITE TM 545 filter aid.

An initiator which produces carbon-centered radicals, sufficiently mild not to destroy the metal chelate chain transfer agent, is typically employed in preparing the oligomeric chain transfer agent employed in the present invention. Azo compounds, as described below, are suitable initiators.

The kind of reaction sequence which is preferably employed for preparing the oligomeric chain transfer agents, although with reference to the particular case where X is -GOOCH$_3$ in the above formula, is illustrated as follows.

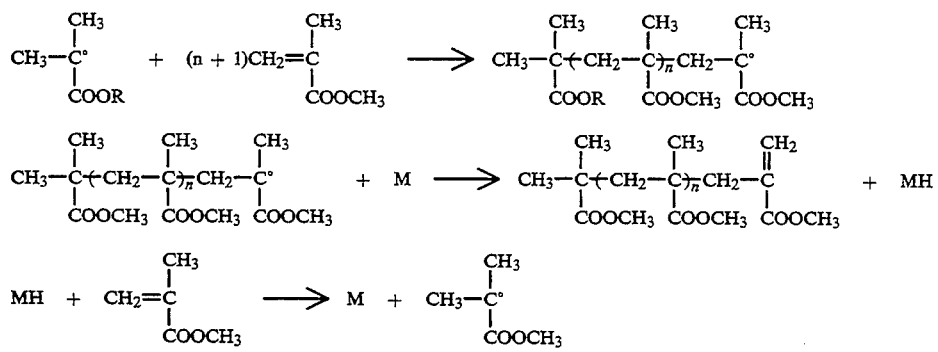

wherein "M" is a metal chelate catalytic chain transfer agent such as one of the cobalt complexes known to those of skill in the art.

As will be apparent to one skilled in the art, these oligomers could also be prepared in situ from appropriate reactants, although they are preferably made separately and then added to the polymerization reaction mixture.

The polymerization process in which polymers or copolymers are produced for use in the present compositions, which process employs the above described oligomeric chain transfer agents, is suitably carried out at 20° to 200° C., preferably 40°-160° C., more preferably 50°-145° C.

Any source of radicals or any of the known class of polymerization initiators is suitable, provided the initiator has the requisite solubility in the solvent or monomer mixture chosen and has an appropriate half life at the temperature of polymerization. Polymerization initiators may be redox or thermally or photochemically induced, for example azo, peroxide, peroxyester, or persulfate. Preferably, the initiator has a half life of from about I minute to about 1 hour at the temperature of polymerization. Some suitable initiators include ammonium persulfate, azocumene; 2,2'-azobis (2-methyl)-butanenitrile; 4,4'-azobis(4-cyanovaleric acid); and 2-(t-butylazo)-2-cyanopropane. Other non-azo initiators having the requisite solubility and appropriate half life may also be used.

The polymerization process can be carried out as either a batch, semi-batch, continuous, or feed process. When carried out in the batch mode, the reactor is typically charged with oligomeric chain transfer agent and monomer, or medium and monomer. To the mixture is then added the desired amount of initiator, typically such that the M/I (monomer to initiator) ratio is 10 to 200. In typical examples, the oligomeric chain transfer catalyst is added in the amount such that the catalyst/initiator or C/I ratio is in the range of 0.10 to 20. The mixture is heated for the requisite time, usually one-half hour to ten hours. In a batch process, the reaction may be run under pressure to avoid monomer reflux and the medium can be viewed as absorbing the reaction heat.

If the polymerization is to be carried out as a feed system, the reaction is typically carried out as follows. The reactor is charged with medium, typically an organic solvent. Into a separate vessel are placed the monomer and oligomeric chain transfer agent. In a separate vessel is added initiator and medium. The medium in the reactor is heated and stirred while the monomer and oligomer solutions are introduced, for example by a syringe pump or other pumping device. The rate of feed is determined largely by the quantity of solution. When the feed is complete, heating may be continued for an additional half hour or more.

In either type of process, the polymer may be isolated by stripping off the medium and unreacted monomer or by precipitation with a non-solvent. Alternatively, the polymer solution may be used as such, if appropriate to its application.

As indicated above, the polymerization can be carried out either in the absence of, or in the presence of, a polymerization medium. Many common organic solvents are suitable as polymerization media. These include aromatic hydrocarbons, such as benzene, toluene and the xylenes; ethers, such as tetrahydrofuran, diethyl ether and the commonly available ethylene glycol and polyethylene glycol monoalkyl and dialkyl ethers, including the Cellosolves and Carbitols; alkyl esters of organic acids and mixed ester-ethers, such as monoalkyl ether-monoalkanoate esters of ethylene glycol. In addition, ketones, such as acetone, butanone, pentanone and hexanone are suitable, as are alcohols such as methanol, ethanol, propanol and butanol. It may be advantageous to use mixtures of two or more solvents. Certain solvents may be preferred for environmental or toxicological reasons.

To produce the polymers for use in the present composition, free radical polymerization, in organic medium, water or bulk, of a combination of different monomers is carried out, where the reaction mixture comprises:

(a) at least one monomer, in addition to unsaturation, having a reactive functional group and (b) an effective amount of an oligomeric chain transfer agent which has the required end group structure, for example as obtained via cobalt chain transfer.

As indicated above, suitable reactive functional groups include, for example, hydroxy (OH), carboxylic acid (COOH), epoxy, silyl, amine, amide, acetoacetoxy, anhydride, cyanato, or combinations thereof. The reaction mixture being polymerized suitably comprises about 2.0 to 100 percent, by weight, preferably 5 to 60 percent, more preferably 10 to 50%, and most preferably 20 to 40 percent, by weight, monomers carrying such crosslinkable or reactive sites. The comonomers may comprise typical monomers or macromonomers made from monomer units or having bulky pendant groups. Macromonomers are typically used in making graft or branched copolymers. Commonly co-assigned co-pending patent application No. 08/104,958 filed cocurrently herewith, which application discloses examples of macromonomers which may be used in forming such polymers, is hereby incorporated by reference in its entirety.

The crosslinkable polymer products for use in the present compositions suitably have a number average molecular weight per functional group of 70 to 6000, preferably 200-2000, and most preferably 200-1000.

As indicated earlier, the polymerization process is suitably carried out with a variety of comonomers in the reaction mixture employed to form the copolymer product. The invention has wide applicability in the field of free radical polymerization and may be used to produce homopolymers and copolymers and compositions having many uses. The polymers produced thereby may exhibit improved durability, including improved resistance to ultraviolet degradability. Such polymers may be used in coatings, including clearcoats and basecoat finishes or paints for automobiles and other vehicles or maintenance finishes for a wide variety of substrates. A composition according to the present invention is especially useful as a high performance coating, most especially automotive finishes and industrial maintenance finishes. Such coatings may further include pigments, durability agents, corrosion and oxidation inhibitors, flow agents, sag control agents, metallic flakes, biocides, ultraviolet stabilizers (hindered amines and UV absorbers), water scavengers, and other additives. In the case of waterborne coatings, emulsifiers, antifoaming agnents and/or surfactants may be added. Additional applications are in the fields of imaging, electronics, for example photoresists, engineering plastics, inks (especially for ink-jet devices), adhesivies, dispersants, sealants, and polymers in general.

For such above-indicated commercial applications, the present composition may comprise, by weight of (a) and (b) below:

(a) 5 to 60 percent, preferably 20 to 40 percent, of a crosslinking agent and (b) 40 to 95 percent, preferably 80 to 60 percent, of a functional polymer made by the present process of polymerizing a functional monomer in the presence of an oligomeric chain transfer agent having the required end group structure.

Such a composition may be used in pigmented or unpigmented coatings for improved properties, including longer pot-life, greater durabililty, and lower VOC. The present invention may also be used advantageously to obtain more consistent or better utilization of functional monomers and/or reduction in the level of such functional monomers to lower the cost without losing the desired film properties thereof.

When the present compostions are used as automotive finishes, it is typical to apply a clearcoat over a basecoat where the basecoat or clearcoat or both may be an aqueous or solvent based composition. According to the present invention, such a basecoat or clearcoat or both may be made by polymerization of monomers in the presence of an oligomeric chain transfer agent as described herein.

The polymers used in the present invention may be pseudotelechelical polymers. This requires, however, the utilization of very low molecular weight counsaturated oligomeric chain transfer agents made from functional group containing monomers, in the polymerization of a desired monomer composition. The chain tranfer agents may thus be used to control molecular weight as well as providing a route to terminally fincitionalized polymers. In the chain transfer step, the propagating radical will contain the desired functional group, thus providing an initiating terminus with functionality also. When using an initiator containing the desired functional group, the polymers produced will have a higher degree of functionality at both terminus.

For example, a hydroxy terminated polymer of methyl methacrylate, having a molecular weight ($M_n$) of 2000 (DP=20), could be produced by polymerizing methyl methacrylate monomer with a hydroxyl containing radical initiator in the presence of an oligomer made from hydroxyethyl methacrylate having a DP equal to 2. The chain transfer process, by definition, terminates the growing radical chain. A specific end group is placed at the end of the polymer which in this case is a hydroxyethyl methacrylic group. In concert with this transfer, a hydroxymethacrylate radical is produced, which becomes the new propagating radical.

Pseudo-telechelics are polymers defined as telechelical in nature, but also having low levels of functional monomer. For example according to the above example, there would be hydroxyethyl methacrylate with the methylmethacrylate monomer. These polymers are useful in coatings applications that use functional groups as cross-linking sites. This method would then insure that a very high percentage of the polymers would containg at least two cross-linkable sites. This is particulary important with low molecular weight polymers.

Thus, according to one aspect of the present invention, terminally functional polymers such pseudo-telechelics can be prepared advantageously and inexpensively. As a result, lower molecular weight polymers may be allowed, which in turn can help with VOC (volatile organic compounds) problems. By havng reactive sites at one or both ends, crosslinking is very effective. There is also, if desired, a lower probability multiple functional monomers per polymer, which in turn can help to lower the cost of more expensive functional monomers.

The following examples demonstrate the method of the present invention. Unless indicated otherwise, all parts are by weight and all molecular weights are based on a polystyrene standard.

EXAMPLE 1

This example illustrates the preparation of a pMMA oligomeric chain transfer agent such as employed in the present invention. A reactor was equipped with a stirrer, thermocouple, and condensor. The reactor was held under nitrogen positive pressure and the following ingredients were employed.

|  | Parts by Weight |
|---|---|
| Part 1 | |
| Ethyl acetate | 248.66 |
| Methyl methacrylate | 499.07 |
| Part 2 | |
| Ethyl acetate | 87.25 |
| Catalyst* | 0.3540 |
| Part 3 | |
| Methyl methacrylate | 1996.71 |
| Part 4 | |
| VAZO 52 | 19.62 |
| Ethyl acetate | 848.33 |

*diaquobis (borondifluorodiphenyl-glyoximato) cobaltate (II)
Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

EXAMPLE 2

This example illustrates the preparation of a EMA/BMA oligomeric chain transfer agent such as employed in the present invention, wherein EMA is ethyl methacrylate and BMA is butyl methacrylate. A reactor was equipped with a stirrer, thermocouple, and condensor. The reactor was held under nitrogen positive pressure and the following ingredients were employed.

|  | Parts by Weight |
|---|---|
| Part 1 | |
| Ethyl acetate | 248.66 |
| Ethyl methacrylate | 250.00 |
| Butyl methacrylate | 250.00 |
| Part 2 | |
| Ethyl acetate | 87.25 |
| Catalyst* | 0.3540 |
| Part 3 | |
| Ethyl methacrylate | 998.36 |
| Butyl methacrylate | 998.36 |
| Part 4 | |
| VAZO 52 | 19.62 |
| Ethyl acetate | 648.33 |

*diaquobis (borondifluorodiphenyl-glyoximato) cobaltate (II)
Part 1 was charged to the reactor and heated to 80° C. When the temperature stabilized at 80° C., Part 2 was charged to the reactor as a single shot feed. Part 3 (the monomer feed) and Part 4 (the initiator feed) were added concurrently, except that Part 3 was added over 240 minutes and Part 4 was added over 300 minutes. When the initiator feed in complete, the reaction mixture is held for 30 minutes. The solvent and unreacted monomer are then distilled off.

EXAMPLE 3

This example illustrates a method of preparing a oligomeric chain transfer agent comprising glycidyl methacrylate monomeric units. A dry reactor was equipped with a stirrer, thermocouple, and condensor. The reactor was held under nitrogen positive pressure and the following components were introduced, as explained below.

|  | Wt. (g) |
|---|---|
| Part 1 | |
| Ethyl acetate | 248.66 |
| Glycidyl methacrylate (GMA) | 499.07 |

-continued

|  | Wt. (g) |
|---|---|
| Part 2 | |
| Ethyl acetate | 87.25 |
| Catalyst* | 2.50 |
| Part 3 | |
| GMA | 1996.71 |
| Part 4 | |
| VAZO ™ 52 | 19.62 |
| Ethyl acetate | 648.33 |

*diaquobis (borondifluorodiphenyl-glyoximato) cobaltate (II)
Part 1 was introduced into reactor and heated to 80° C. Part 2 was charged to the reactor in a single shot. When temperature stabilized, Part 3 and 4 were charged to the reactor over 240 and 300 minutes, respectively. At the completion of adding Part 3, the reactor was held at temperature for 30 minutes before cooling.

EXAMPLE 4

This example illustrates the preparation of an oligomeric chain transfer agent comprising monomeric units of gamma-methacryloxypropyl trimethoxy silane (MPTMS) by a continuous polymerization process. A dry reactor was equipped with a stirrer, thermocouple, and condensor. The reactor was held under nitrogen positive pressure and the following components were introduced, as explained below.

|  | Wt. (lb) |
|---|---|
| Monomer Feed | |
| MPTMS | 636.74 |
| Co(II)(DPG-BF$_2$)$_2$2H$_2$O | 0.26 |
| Initiator Feed 1 | |
| VAZO 52 | 3.95 |
| Toluene solvent | 80.74 |
| Initiator Feed 2 | |
| VAZO ™ 52 | 3.95 |
| Toluene solvent | 80.74 |

The present continuous stirred tank acrylic polymerization process is comprised of three in-series 10 gallon reactors. Reactor 1 & 2 are filled with toluene solvent and brought up to reflux. Part 1 (monomer and cobalt complex) are fed into Reactor 1 at 0.79 lb/minute for 806 :minutes. Part 2 (Initiator Feed 1) and Part 3 (Initiator Feed 2) are delivered to Reactor 1 and 2, respectively, concurrently with the Part 1, each at 0.1.69 lb/minute for 500 minutes. Reactor 3 is held at 110° C. to strip solvent.

EXAMPLE 5

This example illustrates a continuous polymerization process for the preparation of an oligomeric chain transfer agent which is the copolymerization product of hydroxyethyl methacrylate (HEA) and methyl methacrylate (MMA) monomers in the weight ratio of HEA/MMA of 80:20. A dry reactor was equipped with a stirrer, thermocouple, and condensor. The reactor was held under nitrogen positive pressure and the following components were introduced, as explained below.

|  | Wt. |
|---|---|
| Monomer Feed | |
| HEMA | 59.05 |
| MMA | 1476.4 |
| Initiator Feed for Reactor 1 | |
| VAZO ™ 52 | 49.2 |
| MEK (methyl ethyl ketone) solvent | 486.1 |

| | Wt. |
|---|---|
| Co(II)(DPG-BF$_2$)$_2$2H$_2$O | 1.2 |
| Initiator Feed for Reactor 2 and 3 | |
| VAZO ™ 52 | 196.9 |
| MEK solvent | 1944.3 |

The present continuous stirred tank acrylic polymerization process is comprised of three in-series reactors. Reactors 1, 2 and 3 are filled with MEK solvent and brought up to reflux. The monomer feed is fed into Reactor I only at 12.30 g/minute. The initiator feed for Reactor 1 is delivered into Reactor 1, concurrently with the monomer reed, at 0.89 g/minute. Initiator feeds 2 and 3 are delivered to Reactors 2 and 3, respectively, at a rate of 3.67 g/minute. The product oligomer is collected as it flows out of Reactor 3. Solvent removal can take place to provide a product at higher concentration.

EXAMPLE 6

This example illustrates a method of preparing an epoxy resin consisting of GMA/STY/BMA/BA in the weight ratio of 30: 17.5: 35: 17.5 in which the aforesaid acronyms respectively respresent glyicidyl methacrylate, styrene, butyl methacrylate, and butyl acrylate. The chain transfer agent comprised glycidyl methacrylate, that is, the chain transfer agent was glycidyl (epoxy) functional. A one liter reactor was equipped with a stirrer, thermocouple, and condensor. The reactor was held under nitrogen positive pressure and the following components were introduced, as explained below.

| Part | Ingredient | Grams |
|---|---|---|
| I | GMA oligomer | 70.0 |
| | t-Butyl peroxyoctoate | 1.0 |
| | Xylenes | 50.0 |
| II | Xylenes | 50.0 |
| | t-Butyl peroxyacetate | 4.0 |
| III | Styrene | 40.0 |
| | Butyl methacrylate | 80.0 |
| | Butyl acrylate | 40.0 |

Part I was charged into the reactor and heated to 120° C. for 45 minutes. The temperature was increased to 130° C. and Part II and III were fed concurrently into the reactor over 300 and 240 minutes, respectively. After completing the addition of Part II, the reactor contents were held at 130° C. for an additional 60 minutes. The solids content was measured at 68.7%. The macromonomer product had an $M_n$ of 1736 and an $M_w$ of 5460. The Brookfield viscosity at 22.2° C. was measured (at 20 RPM) at 4.0 poise and (at 50 RPM) at 3.9 poise.

EXAMPLE 7

This example illustrates a method of preparing a resin consisting of GMA/STY/BMA/BA in the weight ratio of 33: 17: 33: 17 in which the aforesaid acronyms respectively respresent glyicidyl methacrylate, styrene, butyl methacrylate, and butyl acrylate. The chain transfer agent comprised glycidyl methacrylate, that is, the chain transfer agent was glycidyl (epoxy) functional. A one liter reactor was equipped with a stirrer, thermocouple, and condensor. The reactor was held under nitrogen positive pressure and the following components were introduced, as explained below.

| Part | Ingredient | Grams |
|---|---|---|
| I | GMA oligomer | 80.0 |
| | t-Butyl peroxyacetate | 1.0 |
| | Xylenes | 50.0 |
| II | Xylenes | 50.0 |
| | t-Butyl peroxyacetate | 3.0 |
| III | Styrene | 40.0 |
| | Butyl methacrylate | 80.0 |
| | Butyl acrylate | 40.0 |

Part I was charged to the reactor and heated to 120° C. for 45 minutes. The temperature was then increased to 130° C. and Part II and III were fed concurrently to reactor over 300 and 240 minutes, respectively. After completing the addition of Part II, the reactor contents were held at 130° C. for an additional 60 minutes. The solids content was measured at 69.8%. The macromonomer product had a number average molecular weight (Mn) of 1967 and an weight average molecular weight ($M_w$) of 5681.

EXAMPLE 8

This example illustrates the use of the epoxy resin, according to Examples 6 and 7, in a clearcoat composition. The following components were thoroughly mixed:

| EXAMPLE | 6 | 7 |
|---|---|---|
| Epoxy resin | 19.9 | 19.9 |
| Acrylic acid resin | 18.8 | 16.9 |
| (66.6% solids; 0.001916 Eq./g resin solids) | | |
| PM acetate solvent* | 1.1 | 1.1 |
| Butyl acetate solvent | 14.5 | 20.0 |
| Tetrabutyl phosphonium chloride | 0.5 | 0.5 |
| (25% in PM acetate) | | |

*Propyleneglycolmethyl ester acetate

The resulting clearcoat composition exhibited the following film properties after being sprayed on a primed steel test panel:

| Epoxy Resin Example | Film Build (mils) | Bake (°F./min) | Hardness (Knoop) | Solvent Resistance (MEK rubs) |
|---|---|---|---|---|
| 6 | 2.7 | 265/30 | 7.2 | 7 @ 100 rubs |
| | 2.1 | 285/30 | 7.1 | 8 @ 100 rubs |
| 7 | 3.1 | 265/30 | 9.1 | 5 @ 100 rubs |
| | 2.3 | 285/30 | 8.1 | 8 @ 100 rubs |

EXAMPLE 9

This example demonstrates the use of acrylosilane oligomer comprising trimethoxysilypropyl methacrylate (MPTMS) monomeric units to make acrylosilane functional polymer. This copolymer is than formulated into a coating finish which utilizes the hybrid crosslinking chemistry of an acrylosilane polymer and a hydroxy-melamine. The acrylosilane copolymer was the polymerization reaction of the a monomer mixture consisting of STY/MPTMS/MMA/BMA/2-EHA in the ratio of 35.2: 36.5: 17: 5.67 5.67, respectively, as described below.

| Part I | |
|---|---|
| Trimethoxysilypropyl methacrylate (MPTMS) oligomer (46.4% in isopropyl alcohol) | 555.0 |
| Trimethylorthoacetate (TMOA) | 30.0 |

| | |
|---|---|
| t-Butylperoxyoctoate (70% in mineral spirits) | 2.0 |
| Part II | |
| Xylene | 50.0 |
| Styrene (STY) | 248.0 |
| n-Butylmethacrylate (BMA) | 40.0 |
| 2-Ethylhexylacrylate (2-EHA) | 40.0 |
| Methylmethacrylate (MMA) | 120.0 |

Part I was charged to a glass reactor equipped with a stirrer, thermocouple, nitrogen positive pressure and a condenser. The mixture was heated to 120° C. for 45 minutes. The reactor was then cooled to 80° C., at which time Parts II and III were fed concurrently to the reactor over 360 and 240 minutes, respectively. Upon completing the addition of Part II, the reactor was held at 80° C. for an additional 60 minutes and cooled to ambient temperature.

COMPARATIVE EXAMPLE 10

This example illustrates the synthesis of a typical acrylosilane resin without the use of the present oligomeric chain transfer agents. This copolymer was then formulated into a coating finish which utilized the hybrid crosslinking chemistry of acrylosilane and hydroxy-melamine components. The acrylosilane copolymer was synthesized as the polymerization product of the monomers STY/MPTMS/MMA/BMA/2-EHA in the ratio of 20:52: 16:6:6.

| | Wt. |
|---|---|
| Part I | |
| Xylene | 65.1 |
| Hydrocarbon solvent (b. p. range = 150–160° C.) | 97.6 |
| Part II | |
| Styrene (STY) | 119.0 |
| n-Butyl methacrylate (BMA) | 35.6 |
| 2-Ethyl hexylacrylate (2-EHA) | 35.6 |
| Methy methacrylate (MMA) | 95.2 |
| Trimethoxysilypropyl methacrylate (MPTMS) | 309.3 |
| Hydrocarbon solvent (b. p. range = 150–160° C.) | 9.2 |
| Xylene | 15.3 |
| Part III | |
| t-Butylperoxyacetate (70% in mineral spirits) | 31.3 |
| Hydrocarbon solvent (b. p. range = 150 = 160° C.) | 22.3 |
| Xylene | 22.3 |

Part I was charged to a glass reactor equipped with stirrer, thermocouple, nitrogen positive pressure and condenser and heated to 148°–150° C. Part II and III were fed concurrently to the reactor over 360 and 420 minutes, respectively. Upon completion of the introduction of Part III, the reactor was held at reflux for an additional 60 minutes and cooled to ambient temperature.

EXAMPLES 11–12

This example illustrates a coating formulation 11 and a comparative coating formulation 12 prepared using the acrylosilane polymers of previous Example 9 and comparative Example 10, respectively. The formulations contained the following thoroughly mixed components:

| Component | Example 11 | Comparative Example 12 |
|---|---|---|
| Acrylosilane resin solution | | |
| Example 9 | 192.42 | — |
| Comparative Example 10 | — | 192.42 |
| NAD Resin Solution (70% solids) | 25.51 | 25.51 |
| Tinuvin ™ 123 stabilizer | 4.63 | 4.63 |
| Tinuvin ™ 1130 stabilizer | 4.63 | 4.63 |
| Acrylic polyol resin soln. (71.5% solids) | 109.04 | 109.04 |
| NAD resin soln. (65.5% solids) | 104.05 | 104.05 |
| DDBSA/AMP soln. (33.8%) | 8.12 | 8.12 |
| TMOA | 15.68 | 15.68 |
| Methyl alcohol | 14.25 | 14.25 |
| Cymel ™ 1168 melamine formaldehyde resin | 19.53 | 19.53 |
| Resiflow ™ S (flow control agent) (50% in hydrocarbon solvent) | 1.43 | 1.43 |
| Dibutyl tin dilaurate | 0.71 | 0.71 |

The compositions of Example 11 and Comparative Example 12 were applied to primed test panels and found to exhibit the following film properties.

| Example | Bake (°F./min) | Hardness (Knoop) | Acid Etch* Spot Free Temp. |
|---|---|---|---|
| 11 | 265/30 | 7–8 | 117 |
| 12 | 265/30 | 7–8 | 118 |

*Spot Free Temperature is the temperature (°F.) at which 10% sulfuric acid will not etch the fully cured film.

Based on the above results, it was concluded that the copolymer made in Example 11 retained the film's acid etch properties as well or better than the acrylosilane resin made by conventional free radical polymerization techniques even though Example 11 used substantially less silane (MPTMS) monomer: 36.5% versus 52% for Example 12. While not wishing to be bound by theory, it is theorized that comparable acid etch resistance was obtained with considerably less MPTMS because of how the copolymer in Example 11 was assembled: By using the chain transfer characteristics of the vinyl terminated MPTMS oligomer, nearly every polymer chain was assured of having at lease one MPTMS monomer unit on the polymer. (In contrast, polymers containing zero MPTMS units will not participate in the acrylosilane cure mechanism.) In random copolymerization, as in Example 12, higher levels of MPTMS are required to insure that every polymer chain has a minimum number of MPTMS units.

EXAMPLE 13

These examples illustrate acrylic polymerization of a reaction mixture of STY/nBA/HPA/pMMA oligomer, in the respective ratio of 15:30-X: 17:38: X, where STY is styrene monomer, nBA is n-butyl acrylate, HPA is hydroxypropylacrylate, and pMMA is a poly(methyl methacrylate) ω-unsaturated oligomeric chain transfer agent. The following components were used:

| | Parts by Weight |
|---|---|
| Part 1 | |
| Hexylacetate | 195.70 |
| Part 2 | |
| n-Butyl methacrylate | 174.3-X |
| Styrene | 87.15 |
| n-Butyl acrylate | 97.34 |
| Hydroxypropyl acrylate | 222.21 |
| p(MMA) oligomer | X |
| Hexylacetate | 1.31 |

-continued

| | Parts by Weight |
|---|---|
| Part 3 | |
| VAZO 67 | 18.35 |
| Hexylacetate | 30.02 |

Part 1 is charged to a reactor equipped with a stirrer, thermocouple, nitrogen positive pressure and a condensor. The reaction mixture is heated to 110° C. Part 2 is charged to the monomer vessel and added to the reactor over 360 minutes. Part 3 is charged to an initiated feed vessel, premixed, and added to the reactor over 375 minutes concurrenly with the monomer feed. Following completion of the initiator feed, the reaction mixture is held for 60 minutes. The results are shown in Table 1 below.

TABLE 1

| Example | pMMA Oligomer Added for nBMA (%/Grams) | Mol. Wt. $M_w$ | $M_n$ | D |
|---|---|---|---|---|
| Control | 0% | 19620 | 8385 | 2.34 |
| 13 | 10%/58.10 gms | 15095 | 6769 | 2.23 |

EXAMPLE 14–16

These examples illustrate the preparation of a copolymer made from a mixture of STY/HEMA/IBMA/MMA/pMMA oligomer in the respective ratio of 15:20:45:20-X: X, wherein STY is styrene, HEMA is hydroxyethyl methacrylate, IBMA is isobutyl methacrylate, and MMA is methyl methacrylate monomer. The oligomer pMMA is poly(methyl methacrylate) which is a ω-unsaturated oligomeric chain transfer agent.

| Ingredients | Parts by Weight |
|---|---|
| Part 1 | |
| BUAC | 885.71 |
| MMA oligomer | X |
| Part 2 | |
| Styene | 306.05 |
| HEMA | 408.07 |
| IBMA | 918.15 |
| MMA | 408.07-X |
| BUAC | 61.21 |
| Part 3 | |
| POIB | 59.17 |
| BUAC | 230.56 |
| Part 4 | |
| POIB | 18.98 |
| MEK | 204.03 |

In the above list, BUAC stands for butyl acetate, HEMA stands for hydroxyethyl methacrylate, IBMA stands for isobutyl methacrylate monomer, MEK stands for methyl ethyl ketone solvent and POIB stands for t-butylperoxyisobutyrate (80% in mineral spirits). Part 1 is added to a reactor equipped with a condenser, stirrer, nitrogen purge, feed system, heating mantle, and heated to reflux. Part 2 is premixed and fed to the reactor over 3 hours simultaneously with Part 3. Part 3 is premixed and fed to the reactor over 3 hours simultaneously with Part 2. After Parts 2 and 3 have been added, the contents of Part 4 are premixed and fed to the reactor over 1 hours. The mixture is held 1 hour at reflux. A summary of the results is shown in Table 2.

TABLE 2

| Resin | % MMA Monomer | % Conversion | $M_n$ | $M_w$ | D | Gardner-Holtz Visc. |
|---|---|---|---|---|---|---|
| Control | 0 | 100 | 6912 | 16,231 | 2.35 | Z-2 |
| Example 14 | 2.5%/51.0 gms | 99 | 5749 | 11,867 | 2.06 | Y |
| Example 15 | 3.5%/71.4 gms | 99 | 5045 | 10,488 | 2.08 | X |
| Example 16 | 5.0%/102.0 gms | 99 | 4811 | 9,173 | 1.91 | W + ½ |

EXAMPLES 17–18

This example illustrates the preparation of a hydroxy functional polymer employing an ethyl methacrylate oligomer as a chain transfer agent. For the control, the following components were used:

| | Parts by Weight |
|---|---|
| Part 1 | |
| MAK | 439.45 |
| Part 2 | |
| STY | 441.19 |
| EMA | 441.19 |
| LMA | 353.02 |
| HEA | 529.30 |
| Part 3 | |
| MAK | 108.60 |
| TBPA | 35.29 |
| Part 4 | |
| MAK | 202.22 |

In the above list, LMA stands for lauryl methacrylate, MAK stands for methyl amyl ketone, and TBPA stands for t-butyl peroxyacetate (75% in mineral spirits). Part I is charged to a 5 liter flask and heated to reflux at 149°–154° C. Part 2 is premixed and added at a constant rate over 300 minutes with Part 3. Part 3 is also premixed and added with Part 2 at a constant rate over 310 minutes. After completing the addition of Parts 2 and 3, the reaction mixture is held under reflux 30 minutes at 145°–155° C. Finally, Part 4 is added and the mixture cooled to 55°–60° C.

As an example of employing, according to the present invention 5% ethyl methacrylate oligomer as a chain transfer agent, the following components were used:

| | Parts by Weight |
|---|---|
| Part 1 | |
| MAK | 465.41 |
| EMA oligomer | 46.72 |
| Part 2 | |
| STY | 467.26 |
| EMA | 373.51 |
| LMA | 373.88 |
| HEA | 560.57 |
| EMA oligomer | 46.72 |
| Part 3 | |
| MAK | 115.02 |
| TBPA | 35.44 |
| Part 4 | |
| MAK | 214.15 |

Parts by
Part 1 is charged to a 5 liter flask and heated to reflux at 149°–154° C. Part 2 is premixed and added at a constant rate over 300 minutes with Part 3. Part 3 is premixed and added with Part 2 at a constant rate over 310 minutes. After the completion of addition of Pans 2 and 3, the reaction mixture is held under reflux for 30 minutes at 145°-155° C. Pan 4 is added and the mixture cooled to 55°-60° C. The results are shown in Table 3 below:

TABLE 3

| Example | pEMA CTA Wt % on Monomer | Mol. Wt. $M_2$ | $M_n$ | Gardner-Holtz Viscosity |
|---|---|---|---|---|
| 17 | control | 17157 | 5536 | Z3 |
| 18 | 5.0% | 13504 | 4134 | Z1 |

EXAMPLE 19

This example illustrates the preparation of an acrylic polyol for use in a composition according to the present invention and a comparative acrylic polyol. The polyol is prepared with or without an oligomeric chain transfer agent which consists of hydroxy, ethyl methacrylate/-methyl methacrylate (HEMA/MMA) monomeric units in the weight ratio of 80: 20. The acrylic polyol had an overall composition of isobornyl methacrylate (IBOMA)/hydroxyethyl methacrylate (2-HEMA)/2-ethylhexyl methacrylate (2-EHMA)/styrerie (STYRlEE)-/isobutylmethacrylate (IBMA)/methylmethacrylate (MMA) in the weight ratio, respectively, of 50.0/27.5/16.38/2.05/2.03/2.05. The polyol was prepared by continuous polymerization employing the following reactants, inititiator, and solvents.

| | Comp. Exp. 1 | Exp. 2 |
|---|---|---|
| Monomer Feed | | |
| HEMA | 17.36 | 12.31 |
| IBOMA | 31.36 | 31.57 |
| IBMA | 1.28 | 1.28 |
| STYRENE | 1.29 | 1.29 |
| 2-EHMA | 10.34 | 10.34 |
| MMA | 1.29 | 0.03 |
| HEMA/MMA (80:20) oligomer | 0.00 | 6.31 |
| MAK | 36.87 | 36.87 |
| Total | 100.00 | 100.00 |
| Initiator Feed Reactor 1 & 2 | | |
| t-Butylperoxyacetate (70% in mineral spirits) | 34.87 | 34.87 |
| MAK solvent | 65.22 | 65.22 |
| Total | 100.00 | 100.00 |
| Initiator Feed Reactor 3 | | |
| t-Butylperoxyacetate (70% in mineral spirits) | 8.00 | 8.00 |
| MEK solvent | 92.00 | 92.00 |
| Total | 100.00 | 100.00 |

The continuous stirred tank acrylic polymerization process is comprised on three 1000 ml in-series reactors. Reactor 1, 2 and 3 are filled with MAK (methyl amyl ketone) solvent. Reactors 1 and 2 are brought to 165° C. and Reactor 3° to 130° C. The monomer feed is fed into Reactor 1 at a rate of 199.76 g/min. The initiator feed for Reactor 1 is delivered, concurrently with the monomer fee, at a rate of 24.05 g/min. Initiator Feed 2 is delivered to Reactor 2 at a rate of 3.07 g/min. Initiator Feed 3 is delivered to Reactor 2 at a rate of 18.20 g/min. The product is collected as it flows out Reactor 3.

EXAMPLE 20

This experiment shows the comparative results for the use of an acrylic polymer prepared according to Example 19 above, which polymer was made with a HEMA/MMA oligomeric chain transfer agent (CTA), as compared to a control in which the acrylic polyer was made without the use of the chain transfer agent. The comparative results are as follows:

| Control Copolymer (0% CTA on Monomer) | | Example 20 Copolymer (10% CTA on Monomer) |
|---|---|---|
| Solids | 57.5 | 56.0 |
| Visc. | E | B |
| Color | 1 | 1 |
| Cloud | 1.46 | 2.13 |
| Gal. wt. | 8.10 | 8.02 |
| Acid no. | 5.7 | 14.4 |
| $M_n$ | 1600 | 1469 |
| $M_w$ | 2734 | 2715 |
| $M_z$ | 4098 | 4080 |
| $M_p$ | 2816 | 2842 |
| $M_{z+1}$ | 5770 | 5585 |
| $M_w/M_n$ | 1.71 | 1.85 |

| | Parts by Weight |
|---|---|
| Part I (Enamel) | |
| Acrylic Resin | 47.27 |
| Propylene glycol monomethyl ether acetate | 3.08 |
| Methyl amyl ketone | 3.70 |
| Tinuvin 292 HALS (Ciba-Geigy) | .70 |
| Tinuvin 328 UV Absorber (Ciba-Geigy) | .70 |
| Resiflow ® S flow additive | .17 |
| Siloxane solution | .86 |
| Dibutyl tin dilaurate solution | 1.66 |
| Butyl acetate | .03 |
| BYK ® 325 flow additive | .03 |
| Black tint (dispersion) | 41.68 |
| | 100.00 |
| Part II (Isocyanate Activator) | |
| Polyisocyanate (Desmodur ® 3390, Miles, Inc) | 23.37 |
| Butyl acetate | 7.05 |
| Hydrocarbon solvent (Hydrosol ® A170) | 1.30 |
| Diisobutyl ketone | 1.77 |
| Ethyl acetate | 2.31 |
| | 35.80 |
| Part III (Reducer) | |
| Methyl ethyl ketone | 1.65 |
| Butyl acetate | 5.17 |
| Butyl cellosolve acetate | .83 |
| Methyl amyl ketone | .62 |
| | 8.27 |

| Time | Zahn #2 Sec |
|---|---|
| Initial | 25 |
| 1 Hour | 31 |
| 2 Hour | ¢60 |
| 3 Hour | ¢60 |

The resulting coating composition was sprayed onto primed metal panels. The composition cured at ambient temperature and provided a film which was hard, glossy and durable. The formulation gave good appearance and handling. The system had a gel time of 4.25 hours and exhibited good viscosity/pot life as indicated below:

| Part I (Enamel) | |
|---|---|
| Acrylic Resin (prepared in Example 3 above) | 47.27 |
| Propylene glycol monomethyl ether acetate | 3.08 |
| Methyl amyl ketone | 3.70 |
| Tinuvin 292 HALS (Ciba-Geigy) | .70 |
| Tinuvin 328 UV absorber (Ciba-Geigy) | .70 |
| Resiflow ® S | .17 |

-continued

| | |
|---|---|
| Siloxane solution | .86 |
| Dibutyl tin dilaurate solution | 1.66 |
| Butyl acetate | .03 |
| BYK ® 325 | .03 |
| Black tint (dispersion) | 41.68 |
| | 100.00 |
| Part II (Isocyanate Activator) | |
| Polyisocyanate (Desmodur ® 3390, Miles, Inc) | 23.37 |
| Butyl acetate | 7.05 |
| Hydrocarbon solvent (Hydrosol ® A170) | 1.30 |
| Diiobutyl ketone | 1.77 |
| Ethyl acetate | 2.31 |
| | 35.80 |
| Part III (Reducer) | |
| Methyl ethyl ketone | 1.65 |
| Butyl acetate | 5.17 |
| Butyl cellosolve acetate | .83 |
| Methy amyl ketone | .62 |
| | 8.27 |

For comparison, a single stage coating for ambient temperature cure was prepared according to the present invention using the above polyol copolymer prepared with the oligomeric chain transfer agent. A multi-component single stage composition was prepared by mixing the following three mixtures just prior to spray application over a primed substrate.

| | |
|---|---|
| Part I (Enamel) | |
| Acrylic Resin (prepared in Example 3 above) | 47.27 |
| Propylene glycol monomethyl ether acetate | 3.08 |
| Methyl amyl ketone | 3.70 |
| Tinuvin 292 HALS (Ciba-Geigy) | .70 |
| Tinuvin 328 UV absorber (Ciba-Geigy) | .70 |
| Resiflow ® S | .17 |
| Siloxane solution | .86 |
| Dibutyl tin dilaurate solution | 1.66 |
| Butyl acetate | .03 |
| BYK ® 325 | .03 |
| Black tint (dispersion) | 41.68 |
| | 100.00 |
| Part II (Isocyanate Activator) | |
| Polyisocyanate (Desmodur ® 3390, Miles, Inc) | 23.37 |
| Butyl acetate | 7.05 |
| Hydrocarbon solvent (Hydrosol ® A170) | 1.30 |
| Diiobutyl ketone | 1.77 |
| Ethyl acetate | 2.31 |
| | 35.80 |
| Part III (Reducer) | |
| Methyl ethyl ketone | 1.65 |
| Butyl acetate | 5.17 |
| Butyl cellosolve acetate | .83 |
| Methy amyl ketone | .62 |
| | 8.27 |

The resulting coating composition was sprayed onto primed metal panels. The composition cured at ambient temperature and provided a film which was hard, glossy and durable. This formulation gave an improved pot life, appearance and handling versus the formulation of the comparative control. The system had a gell time of 6 hours and exhibited good viscosity/pot life as show below:

| Time | Zahn #2 Sec |
|---|---|
| Initial | 24 |
| 1 Hour | 29 |
| 2 Hour | 34 |
| 3 Hour | 43 |

The best mode presently contemplated for carrying out the invention is represented by the disclosure and claims herein, it being understood that selection of the best mode will depend on a variety of factors, including the monomers being polymerized, the particular chain transfer agent and the initiator employed, and the amounts thereof, and the polymerization conditions such as temperature, pressure, conversion and yield.

We claim:

1. A crosslinkable or curable composition comprising, by weight of (a) and (b) below, the following separate components:
    (a) 5 to 60 percent of a crosslinking agent;
    (b) 40 to 95 percent of a copolymer having crosslinkable groups, which copolymer is the reaction product of free radical polymerization of a reaction mixture comprising:
    (a) for chain transfer, an effective mount of an oligomeric chain transfer agent, or of a molecular weight distribution of oligomeric compounds having the following end group:

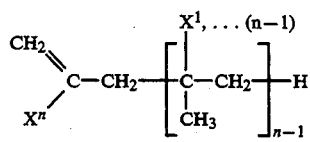

wherein n is on average 2 to 100 and $X^1$ to $X^n$ are independently X, wherein X is $-CONR_2$, $-COOR$, $OR^1$, $-OCOR$, $-OCOOR^1$, $-NRCOOR^1$, halo, cyano, or a substituted or unsubstituted phenyl or aryl, wherein each R is independently selected from the group consisting of hydrogen, silyl, or a substituted or unsubstituted alkyl, alkyl ether, phenyl, benzyl, and aryl, wherein substituted means with a substituent selected from the group consisting of epoxy, hydroxy, isocyanato, cyano, amino, silyl, acid, halo, or acyl; and wherein $R^1$ is the same as R except not H; and wherein each alkyl is independently selected from the group consisting of branched, unbranched, or cyclical hydrocarbons having 1 to 12 carbon atoms; and halo or halogen is bromo, iodo, chloro or fluoro; except excluding the use of a pure dimer when X is substituted or unsubstituted phenyl or aryl; and
    (b) a mixture of monomers, the same or different, of which 2 to 100 percent by weight of the monomers have a reactive functionality which, on the polymerization product, is capable of crosslinking with itself or another polymer.

2. The composition of claim 1, wherein said monomers are ethylenically unsaturated monomers 80–100% by weight of which are selected from the group consisting of methacrylates of the formula $CH_3=C(CH_3)CO_2J$ wherein J is H, $C_1$-$C_{12}$ alkyl, $C_2$-$C_{12}$ alkenyl, glycidyl, $C_2$-$C_{12}$ hydroxyalkyl, $C_xH_{(2x+1-y)}F_y$ where x is 1 to 16 and y is 0 to 2x+1; $R_6R_7N(CH_2)_z$ where $R_6$ and $R_7$ are independently $C_1$ to C12 alkyl and z is 1 to 10, or $R_8R_9R_{10}Si(CH_2)z$ where $R_8$, $R_9$ and $R_{10}$ are independently $C_1$ to $C_{12}$ alkyl or $C_1$ to $C_{12}$ alkoxy and z is 1 to10, and mixtures thereof.

3. The composition of claim 2, wherein 80–100% by weight of said monomers are selected from the group consisting of methacrylic acid, alkyl esters of methacrylic acid, and functional alkyl esters of methacrylic acid.

4. The composition of claim 1, wherein the functionality in (b) is selected from the group consisting of hydroxyl, epoxy, anhydride, carboxyl, silyl, amide, amine, acetoacetoxy, and isocyanato and compatible mixtures thereof.

5. The composition of claim 1, wherein the copolymer is hydroxy-functional acrylic copolymer and the crosslinking agent is an isocyanate.

6. The composition of claims 1, wherein polymerization is conducted in the presence of a said oligomeric compounds, or molecular weight distribution of said oligomeric compounds, in which X is -CONR$_2$, COOR, or an unsubstituted or substituted phenyl or aryl, and R is as defined above.

7. The composition of claim 1, wherein polymerization is conducted in the presence of said oligomeric compounds, or molecular weight distribution of said oligomeric compounds, in which X is -COOR or phenyl and R is alkyl or phenyl, either of which may be unsubstituted or substituted with epoxy, hydroxy, silyl or acid.

8. The composition of claim 1, wherein the oligomeric chain transfer agents employed in the present invention have a distribution of molecular weights and have a degree of polymerization ranging from 2 to 100.

9. The composition of claim 1, wherein the effective amount of said oligomeric compounds is in the range of between 1 and 20% by weight of the comonomers present.

10. The composition of claim 1, wherein the composition is pigmented or unpigmented.

11. The composition of claim 1, wherein the number average molecular weight per functional groups is 200 to 2000.

* * * * *